(12) United States Patent
Sink et al.

(10) Patent No.: US 9,388,785 B2
(45) Date of Patent: Jul. 12, 2016

(54) AUTOMATIC VEHICLE STOP RESTART SYSTEM

(71) Applicants: David Russell Sink, Chuluota, FL (US); Ronald David Nelson, Orlando, FL (US)

(72) Inventors: David Russell Sink, Chuluota, FL (US); Ronald David Nelson, Orlando, FL (US)

(73) Assignee: Standard Motor Products, Long Island, NY (US)

( * ) Notice: Subject to any disclaimer, the term of this patent is extended or adjusted under 35 U.S.C. 154(b) by 813 days.

(21) Appl. No.: 13/773,722

(22) Filed: Feb. 22, 2013

(65) Prior Publication Data

US 2014/0239637 A1  Aug. 28, 2014

(51) Int. Cl.
*H02J 7/00* (2006.01)
*F02N 11/08* (2006.01)
*H02J 7/34* (2006.01)
*B60R 16/03* (2006.01)

(52) U.S. Cl.
CPC ........... *F02N 11/0866* (2013.01); *H02J 7/0013* (2013.01); *H02J 7/34* (2013.01); *B60R 16/03* (2013.01); *F02N 11/0814* (2013.01)

(58) Field of Classification Search
CPC .......... H02J 7/0013; H02J 7/34; B60R 16/03; F02N 11/0866; F02N 11/0814
USPC ...................... 320/104, 126; 290/31
See application file for complete search history.

(56) References Cited

U.S. PATENT DOCUMENTS

| 4,575,670 | A | * | 3/1986 | Hignutt | ................. | H02J 7/0022 |
| | | | | | | 307/66 |
| 2001/0040441 | A1 | * | 11/2001 | Ng | ........................ | H02J 7/0032 |
| | | | | | | 320/104 |
| 2011/0090726 | A1 | * | 4/2011 | Brotto | ................... | H02J 7/0065 |
| | | | | | | 363/131 |

* cited by examiner

*Primary Examiner* — Nathaniel Pelton

(57) ABSTRACT

An electrical system for vehicles that connects multiple batteries in parallel during normal operation but isolates the cranking battery and the starter system from the other batteries and their loads when the engine is started. A common charging system simultaneously maintains all of the batteries. Efficiency and EMC considerations are addressed in the design.

7 Claims, 2 Drawing Sheets

AUTOMATIC VEHICLE STOP RESTART SYSTEM

BACKGROUND

Automobiles, trucks and other internal combustion engine powered vehicles waste a significant amount of fuel and generate unnecessary exhaust when temporarily stopped for traffic signals or other reasons (i.e., pick-ups, drop-offs or deliveries). Such waste may be reduced by turning the engine off during these stopped periods and subsequently restarting the engine when travel is to be resumed. While this stop-restart operation may be performed manually, the process may be effectively automated.

In one approach to such automated stop-restart operation, an on-board computer may be used to detect that the vehicle has been brought to a stop for a pre-defined short period of time, and issue commands causing the engine to shut down. When the driver desires to resume travel, the accelerator is depressed and the computer automatically commands the engine to restart.

Typically, restarting the engine places a high current demand on the electrical system. This high demand causes an increased voltage drop across the vehicle's electrical system wiring harness that may disturb the performance of the lights, entertainment systems, and other accessories powered by the electrical system. This is not only a potential annoyance for the driver and passengers, but may also impact the operation and safety of the vehicle.

An approach to remedying the problems caused by high current demands associated with restarting the engine is to employ a second battery which can be switched into parallel with the primary battery when the engine is restarted. U.S. Pat. No. 5,204,610, entitled LONG LIVED DUAL BATTERY WITH AUTOMATIC LATCHING CIRCUIT, to Pierson et al., discloses a latching automatic dual battery switch that employs a comparator to determine that a load condition requiring engagement of a secondary battery exists. In accordance with the teachings, when the voltage of the primary battery voltage drops below a predetermined threshold or the current drawn from the primary battery exceeds a predetermined threshold, the battery switch automatically engages a secondary battery. This approach suffers in that a drop in voltage must occur before the switch is activated. The voltage drop can also affect the performance of other on-board electrical system components. A second patent, U.S. Pat. No. 5,316,868 entitled. DUAL BATTERY SWITCH CIRCUIT, to Dougherty et al., discloses a two battery system comprising a controller that couples the secondary battery to the primary battery with respect to the load when an attempt is made to apply energy to the load and the temperature is below a predetermined level. Here again, an undesirable voltage drop transient can occur. Each of these inventions further suffers from the need to provide separate charging and maintenance facilities for each battery.

The inventors have identified an automatic stop-restart (ASR) system that satisfies the electrical requirements of restarting the engine while overcoming the voltage drop problem and further allows a single battery charger to service all of the batteries. In accordance with the ASR system architecture, the vehicle is equipped with two batteries. A first battery is connected to supply the heavy current load required to restart the engine after being stopped. A second battery is connected to supply power to the remaining (i.e., non-starting) electrical system loads. While the vehicle is moving or stopped, both batteries are connected in parallel, by a switch network, so that they may both supply power to the entire system and be charged by the vehicle's charging system.

When the vehicle is brought to a stop, the engine is automatically shut down. When the operator wishes to resume movement, the driver depresses the accelerator and the ASR system is activated. The ASR system disconnects the batteries from each other. The first battery can then exclusively supply power to the engine starter system in isolation from the second battery and its associated harness. The first battery's harness and its voltage drop during this brief heavy electrical load will not affect the operation of the components operating from the second battery's harness.

The switch network used to connect and disconnect the two batteries may comprise a mechanical switch, such as a relay or solenoid. There are several disadvantages to the use of the mechanical switch approach including performance degradation over life, reliability, and the generation of unacceptably high levels of electrical and radio frequency interference. The switching of high currents and possibly inductive loads may result in damage to the switches electrical contacts. Such damage can lead to changes in the conduction properties of the switch and eventually to failure. With respect to interference, the almost instantaneous opening and closing of the contacts may result in high voltage impulses and high current surges. The waveform of these impulses and surges may have very fast rise and fall times which contain high frequency spectral components that can radiate or be conducted from the switch contacts. These radiated or conducted spectral components have the potential to disturb other vehicular and passenger systems.

In a preferred embodiment, the switch network used to connect and disconnect the two batteries may comprise an electronic switch network. Among the important characteristics that must be satisfied for this application by an electronic switch network are high current carrying capability, low on-resistance (i.e., connection between batteries), high off-resistance, low power consumption by the switch network, and low interference generation. With respect to repeatability of contact and reliability, electronic switch networks can greatly outperform mechanical implementations. Electronic switches can also be designed to minimize radiated and conducted electrical and radio frequency interference. In contrast to mechanical switches, the electronic network permits the turn-on and turn-off switching waveforms to be independently shaped to optimize the tradeoff between fast switching times and the generation of high frequency spectral components.

BRIEF SUMMARY OF INVENTION

In an embodiment, there is disclosed an Automatic Stop Restart (ASR) method and system for automatically reconfiguring two batteries in a vehicle into first and second interconnection states. In the first interconnection state, corresponding to normal moving or stopped vehicle operation, the two batteries are connected in parallel so as to jointly power all of the vehicular electrical systems. In the second interconnection state, corresponding to restarting the vehicle's engine, one of the two batteries is connected to the engine starting system and the second battery is connected to the remaining (i.e., non-starting) portion of the vehicle's electrical system. In this second state the two batteries and their attached electrical systems are electrically isolated from each other.

The ASR system comprises an electronic battery switch configured to switchably connect the positive polarity terminal of a first battery to the positive polarity terminal of a second battery. Alternatively, the electronic battery switch configured to switchably connect the negative polarity terminal of a first battery to the negative polarity terminal of a second battery. In a further embodiment, two electronic switches may be configured so that the first switchably connects both positive polarity terminals and the second connects the negative polarity terminals.

The switches may comprise one or more parallel connected field effect transistors (FET) having their source element connected to the terminal of a first battery and their drain element connected to the corresponding polarity terminal of the second battery. When the suitable voltage is applied to the gate element of each FET, the resistance between the corresponding source and drain element reduces to a minimal value. Conversely, when a second voltage is applied to the gate element of each FET, the resistance between the corresponding source and drain element increases to a maximum value. The first and second voltages are manifest as electrical charge obtained from a charge reservoir. The charge in the reservoir is maintained by a low power charge pump and conveyed, on command, to the respective FET gate elements by a charge control switch (CCS) via a switching waveform shaping network (WSN). The charge control switch can, on command, apply an electrical charge to the FET gate elements or, alternatively, can discharge a previously applied charge from the FET gate elements thereby turning the FET switches on or off.

The charge control switch may be commanded by an optical coupled interface thereby providing dc isolation between the ASR system and the vehicle's computer that generates the commands. The charge pump, charge reservoir, charge control switch (CCS), switching waveform shaping network, and optical coupled network obtain their bias power by means of a bias network which automatically selects between the first and second battery as determined by the relative voltage levels of the two batteries. The bias network further provides filtering of interference waveforms.

In an embodiment there is provided a vehicular electrical system including an engine starting portion and a non-engine starting portion, the electrical system may comprise: a main and a secondary battery, the main battery is non-switchably connected to an engine starting portion of a vehicular electrical system, the secondary battery is non-switchably connected to a non-starting portion of the vehicular system; a battery switch that, in a first switch state, is configured to connect the main and the secondary batteries and their respective loads in parallel in response to a first signal waveform, and, in a second switch state, is configured to isolate the first and second batteries and their respective loads from each other in response to a second signal waveform, wherein the signal waveforms are received via a switch control input port; a wave shaping network connected to the switch control input port, the wave shaping network comprises a separate first waveform shaping portion and a separate second waveform shaping portion; a charge switch, configured to switchably connect an electrical charge source to the first waveform shaping portion of the wave shaping network, wherein switch state of the charge switch is controlled by an externally applied command signal; a discharge switch, configured to switchably connect a charge sink to the second waveform shaping portion of the wave shaping network, wherein switch state of the discharge switch is controlled by the externally applied command signal.

The embodiments further provide that the electrical charge source may comprise a charge-reservoir and a charge pump electrically connected to the charge-reservoir, the charge pump being configured to charge charge-reservoir to a voltage greater than nominal voltage of the first or second batteries and that the charge reservoir comprises a capacitor. The charge reservoir requires minimal quiescent current yet provides an abundance of MOSFET gate drive current (charge). The charge pump may obtain bias power from an or-gate configured to select battery having the highest voltage from the main battery and the secondary battery. The battery switch may be one or more paralleled field effect transistors with each of the source electrodes connected to a terminal of the main battery and each of the drain electrodes connected to a same polarity terminal of the secondary battery. The externally applied command signal may be input via an opto-electrical isolator.

DESCRIPTION OF FIGURES

A preferred embodiment of the present invention is described in detail below with reference to the attached drawing figures, wherein.

DETAILED DESCRIPTION OF EMBODIMENTS

In an embodiment of the invention, a system, method and apparatus is described for battery management wherein two or more batteries are switchably connected so that in a first switch state, the batteries are connected in parallel and provide power to a composite of electrical loads. In a second switch state, the two or more batteries are electrically isolated from one another and each is connected to exclusive portions of the composite of electrical loads. For descriptive purposes, the two or more batteries are physically separable units, although the apparatus may comprise a single battery having electrically separable portions.

In an exemplary application, the invention may be advantageously applied in the field of automotive vehicles. In order to reduce fuel waste and exhaust emissions, it is desirable to stop the vehicle's internal combustion engine when vehicle motion is temporarily stopped. The engine must be restarted to resume motion. In this application, a first battery may be connected to the vehicle's electrical starter system while a second battery is connected to the vehicles remaining electrical systems (i.e., lights, entertainment electronics, instruments, etc.). During normal operation, the two batteries and their corresponding electrical loads are connected in parallel. When the engine is restarted, after the vehicle has been stopped, the batteries and their associated electrical loads are temporarily disconnected from one another so that the first battery's associated load does not affect the voltage applied to the second battery's loads. The performance of vehicle lighting, instrument and entertainment systems is thereby not impacted by restarting the engine. Once the engine is restarted, the batteries are again connected in parallel.

With this configuration, the batteries are connected in parallel for the vast majority of time. This permits the use of a single battery charging system to maintain the state of charge of both batteries.

Inter-battery switches may be either electro-mechanical or electronic. The advantages of the use of an electronic switch over an electro-mechanical switch, such as a relay, include controlled switching waveforms and the absence of sparking between switch contacts. Sparking can damage the electro-mechanical switch contacts and sudden initiation or suspension of large currents can generate high levels of radio frequency and electrical interference. With an electronic switch, the waveform of the transition between switch states may be controlled or shaped thereby minimizing these effects.

Figure 1:
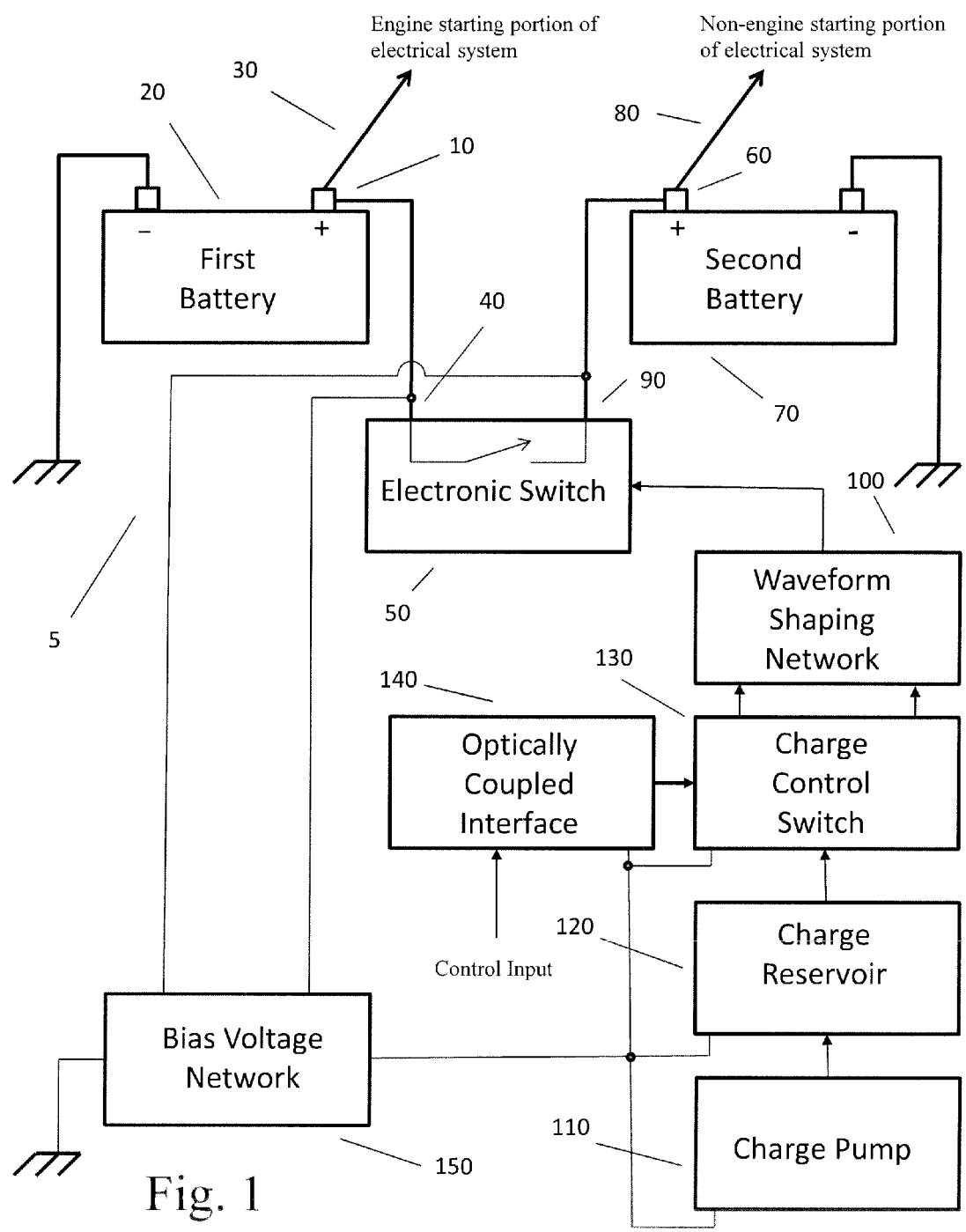
FIG. 1 is a simplified block diagram of an embodiment of the automatic stop restart system.

FIG. 1 is a simplified block diagram of an embodiment of the battery management system 5. The positive terminal 10 of a first battery 20 is connected to the starter (or crank) electrical system (not shown) via wiring harness 30, and to terminal 40 of an electronic switch 50. The positive terminal 60 of the second battery 70 is connected to the other electrical systems (i.e., non-starter) (not shown) of the vehicle via wiring harness 80 and to terminal 90 of electronic switch 50. The electronic switch 50 can be commanded to either of at least two switch states. In the first state, terminal 40 is electrically connected to terminal 90 via a low electrical resistance conduction path. The conduction path is capable of carrying the current flowing between the batteries without damage. In the second switch state, the electrical connection between terminals 40 and 50 is substantially removed and the flow of current is blocked. In some embodiments the switch 50 may be implemented by a solid state device such as one or more IGFETs (Insulated Gate Field Effect Transistor). The source electrode of the FET may be connected to the positive terminal 10 of the first battery 20, while the drain electrode is connected to the positive terminal 60 of the second battery 70. The electrical resistance presented between the source and drain electrodes of the FET may be switched between a low resistance first state value and a high resistance second state value by applying an external bias voltage to the FET's gate electrode. The FET gate presents a capacitive high impedance and therefore does not draw a large current. The applied bias voltage charges the gate capacitance in accordance with the relationship:

$$Q(\text{charge}) = C(\text{capacitance}) * V(\text{voltage})$$

The low current demands of the FET gate can be satisfied by ultra-low power gate drive electronic circuitry. This minimizes the power consumption of the ASR system thereby improving overall efficiency.

Power to operate the ASR system is provided by the first and second batteries by way of a bias voltage network 150. The bias voltage network 150 may be implemented as a logical "OR" network that automatically selects the battery having the higher voltage to operate the ASR and provides filtering to prevent the propagation of interference waveforms on the power leads.

The gate bias voltage required for switching the FET must be greater than the battery voltage. The embodiment shown in FIG. 1 employs a charge pump (i.e. voltage multiplier) 110 to increase the battery voltage to the level required for FET switching. The charge generated in the charge pump is stored in a charge reservoir 120.

The charge pump 110/charge reservoir 120 configuration provides a significant performance advantage over the use of a charge pump alone. Whereas a small quiescent current is required to maintain the FET in the conducting or non-conducting state, a relatively large transient current must be supplied to quickly change the state of the FET. If the charge pump is used without a charge reservoir, the charge pump must be sized to continuously supply the maximum transient current. An adequately sized charge pump continuously dissipates bias power proportional to that maximum current capability. This dissipated power would reduce the efficiency of the system. The use of a charge reservoir allows the use of a smaller charge pump that needs only supply a smaller quiescent current. The transient switching current requirements are satisfied by drawing down the charge stored in the charge reservoir 120. This approach permits the use of a smaller charge pump that has a proportionally smaller power dissipation and therefore higher efficiency.

A charge control switch 130, in response to externally applied switching commands, either sources charge to the FET gate electrode or discharges the gate via a waveform shaping network 100. The turn-on and turn-off characteristics may be individually shaped to optimize the tradeoff between fast switching speed and interference generation. In the embodiment of FIG. 1, the turn-on and turn-off waveforms are individually shaped by the waveform switching network 100.

The externally generated switching commands are applied from an external computer (not shown) via an optically coupled interface 140. The ASR is thereby electrically isolated from the external controller.

Figure 2:
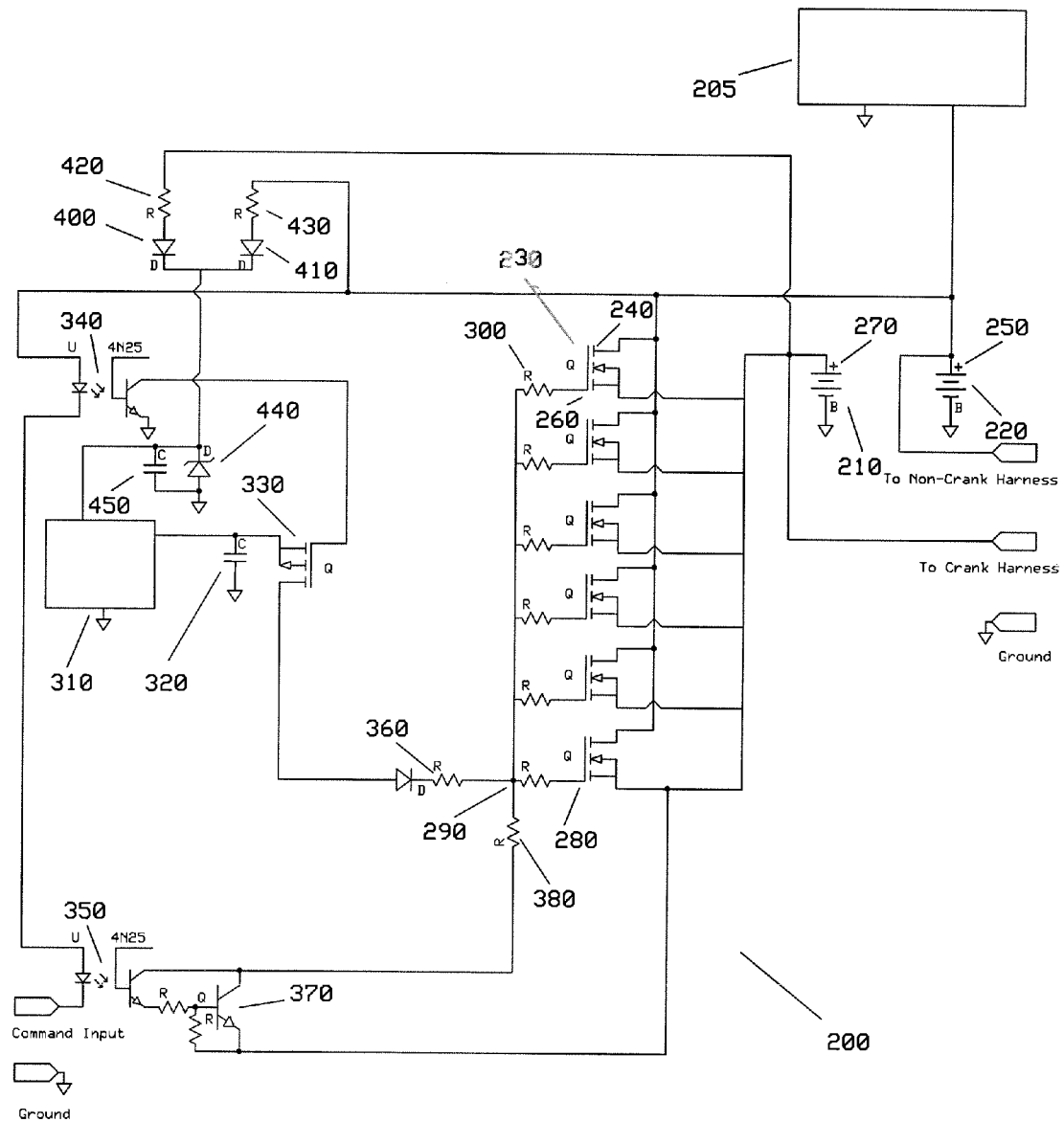
FIG. 2 is a simplified schematic diagram of an embodiment of the automatic stop restart system.

FIG. 2 is a simplified circuit diagram of an embodiment of an ASR system.

The ASR system 200 is comprised of two 12 volt batteries, a crank battery 210 (connected to the starter portion of the electrical system) and a main battery 220 (connected to the remaining electrical system loads). Since the two batteries are connected in parallel most of the time, a single charging system 205 may be configured to maintain the charge state of both batteries.

Six FETs (field effect transistors) 230 are connected in parallel with their drain electrodes 240 connected to the positive terminal 250 of the main battery 220 and their source electrodes 260 connected to the positive terminal 270 of the crank battery 210. The gate electrodes 280 of each of the FETs 230 are also connected in parallel to gate control terminal 290 via isolating resistors 300.

A micro power charge pump 310 charges capacitor 320, which serves as a charge reservoir, to a voltage of approximately 15 volts above the nominal 12 volt battery voltage. The charge pump 310 typically consumes 150 microamps and generates approximately 50 microamperes of boost current. While this current level is adequate to maintain the paralleled FETs 230 in full conduction, it is insufficient to quickly transition the FETs 230 between conductive and non-conductive states. Additional EMC (electromagnetic compatibility) isolation of the charge pump is provided by a filter network comprising resistor 420, resistor 430, capacitor 450, and zener diode 440. Diode 400 and 410 comprise a logical "or" gate that selects the higher voltage battery to power the ASR.

During quiescent periods, the charge pump 310 stores approximately 30 micro coulombs of charge in the charge reservoir 320. This level of charge is more than adequate to rapidly switch the state of the FETs 230.

FET 330 serves as a charge switch to control the flow of charge from the charge reservoir 320 to the FET gate control terminal 290. The charge switch FET 330 is normally-on so that during quiescent operation, it consumes nearly zero operating current. This aids in maintaining the state of charge of the reservoir. Switching the state of the charge switch is accomplished via an opto-coupler interface 340, 350.

The turn-on waveform rising edge is controlled by a network comprising resistor 360 in combination with the discrete and distributed impedances provided by the FETs 230 and associated circuit components. The value of resistor 360 is selected to satisfy the tradeoff between EMC and switching speed considerations. Other circuit configurations may be substituted for resistor 360 to provide any desired waveform shaping.

The six FETs 230 are turned off by draining the charge from the gates. This is accomplished by transistor 370. The state of transistor 370 is also controlled via an opto-coupler interface 350. The turn-off waveform falling edge is controlled by a network comprising resistor 380 in combination with the circuit impedances. As was the case for the turn-on waveform, other circuit configurations may be substituted for resistor 380 to provide any desired waveform shaping.

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

What is claimed:

1. A vehicular electrical system including an engine starting portion and a non-engine starting portion, said electrical system comprising:
   a main and a secondary battery, said main battery is non-switchably connected to an engine starting portion of a vehicular electrical system, said secondary battery is non-switchably connected to a non-starting portion of said vehicular system;
   a battery switch that, in a first switch state, is configured to connect said main and said secondary batteries and their respective loads in parallel in response to a first signal waveform, and, in a second switch state, is configured to isolate said first and second batteries and their respective loads from each other in response to a second signal waveform, wherein said signal waveforms are received via a switch control input port;
   a wave shaping network connected to said switch control input port, said wave shaping network comprises a separate first waveform shaping portion and a separate second waveform shaping portion;
   a charge switch, configured to switchably connect an electrical charge source to said first waveform shaping portion of said wave shaping network, wherein switch state of said charge switch is controlled by an externally applied command signal;
   a discharge switch, configured to switchably connect a charge sink to said second waveform shaping portion of said wave shaping network, wherein switch state of said discharge switch is controlled by said externally applied command signal.

2. The vehicular electrical system in accordance with claim 1 wherein said electrical charge source further comprises:
   a charge reservoir;
   a charge pump electrically connected to said charge-reservoir, said charge pump configured to charge charge-reservoir to a voltage greater than nominal voltage of said first or second batteries.

3. The vehicular electrical system in accordance with claim 2 wherein said charge reservoir comprises a capacitor.

4. The apparatus in accordance with claim 1 wherein said externally applied command signal is input via an opto-electrical isolator.

5. The apparatus in accordance with claim 1 wherein said battery switch is one or more paralleled field effect transistors with each of the source electrodes connected to a terminal of said main battery and all of the drain electrodes connected to a same polarity terminal of said secondary battery.

6. The apparatus in accordance with claim 1 wherein said charge pump obtains bias power from an or-gate configured to select battery having the highest voltage from said main battery and said secondary battery.

7. The apparatus in accordance with claim 1 further comprising a single battery charging system that maintains the state of charge of said main battery and said secondary battery.

\* \* \* \* \*